US008447274B2

(12) United States Patent
Hadinata et al.

(10) Patent No.: US 8,447,274 B2
(45) Date of Patent: *May 21, 2013

(54) MANAGING VOICEMAIL GREETING BASED ON LOCATION OF WIRELESS COMMUNICATION DEVICE (75) Inventors: Martinianus B. Hadinata, Brunnen (CH); Steven C. Lingafelt, Durham, NC (US); John E. Moore, Brownsburg, IN (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 581 days.

This patent is subject to a terminal disclaimer.

(21) Appl. No.: 12/186,575

(22) Filed: Aug. 6, 2008

(65) Prior Publication Data

US 2010/0035584 A1 Feb. 11, 2010

(51) Int. Cl.
*H04M 11/10* (2006.01)
*H04L 12/58* (2006.01)

(52) U.S. Cl.
USPC ........................................ 455/413; 455/412.1

(58) Field of Classification Search
USPC ............. 455/413, 412.1, 412.2, 456.1, 456.3, 455/456.5, 456.6, 414.1, 417–420, 432.1, 455/433; 379/88.18, 70, 88.22, 374.02
See application file for complete search history.

(56) References Cited

U.S. PATENT DOCUMENTS

| 6,256,503 | B1 * | 7/2001 | Stephens .................... 455/456.6 |
| 6,631,183 | B1 * | 10/2003 | Rautila et al. ............. 379/88.22 |
| 6,650,902 | B1 | 11/2003 | Richton |
| 6,940,407 | B2 * | 9/2005 | Miranda-Knapp et al. ......................... 340/572.1 |
| 7,079,630 | B2 | 7/2006 | Green et al. |
| 7,403,599 | B2 * | 7/2008 | Amin ......................... 379/88.14 |
| 7,593,712 | B2 * | 9/2009 | Moton et al. ............... 455/404.2 |
| 7,599,473 | B2 * | 10/2009 | Michael et al. ................. 379/76 |
| 7,653,380 | B2 * | 1/2010 | Graefen ..................... 455/414.1 |
| 7,778,652 | B2 * | 8/2010 | Srey et al. ..................... 455/458 |
| 8,077,837 | B1 * | 12/2011 | Wright et al. .............. 379/88.12 |
| 8,160,551 | B2 | 4/2012 | Hadinata et al. |

(Continued)

OTHER PUBLICATIONS

U.S. Appl. No. 12/186,589, entitled "Managing Voicemail Messages Based on Location of Caller's Wireless Communication Device"; Notice of Allowance dated Dec. 13, 2011.

(Continued)

*Primary Examiner* — Brandon Miller
(74) *Attorney, Agent, or Firm* — Yudell Isidore Ng Russell PLLC (57) ABSTRACT

Disclosed are a method, system and computer program product for managing voicemail greetings on a wireless communication device based on the device's location. A user records location-specific voicemail greetings on the user's wireless communication device, and associates the greetings with specific locations. When an authorized caller calls the user's wireless communication device, the location of the user's wireless communication device is detected, and location information of the user's device is sent to a call switching component. The call switching component presents the caller with the voicemail greeting associated with the location of the user's wireless communication device. The date and time the user's wireless communication device entered the location can be provided via a timestamp and presented to the caller along with the location-specific voicemail greeting, to enable the caller to determine when the user may be available to communicate, based on the combination of the information in the greeting and the timestamp information.

14 Claims, 5 Drawing Sheets

U.S. PATENT DOCUMENTS

| | | | |
|---|---|---|---|
| 2002/0098844 A1* | 7/2002 | Friedenfelds et al. | 455/445 |
| 2002/0164974 A1* | 11/2002 | Kwan et al. | 455/412 |
| 2004/0266399 A1* | 12/2004 | Simpson | 455/412.1 |
| 2005/0053216 A1 | 3/2005 | Spencer et al. | |
| 2005/0089149 A1* | 4/2005 | Elias | 379/88.13 |
| 2007/0082668 A1* | 4/2007 | Silver et al. | 455/432.3 |
| 2008/0002634 A1* | 1/2008 | Mock et al. | 370/338 |
| 2008/0051066 A1* | 2/2008 | Bandhole et al. | 455/413 |
| 2008/0167014 A1* | 7/2008 | Novick et al. | 455/413 |
| 2008/0220755 A1* | 9/2008 | Bushnell et al. | 455/417 |
| 2009/0310761 A1* | 12/2009 | Ray | 379/88.19 |

OTHER PUBLICATIONS

U.S. Appl. No. 12/186,589, entitled "Managing Voicemail Messages Based on Location of Caller's Wireless Communication Device"; Final office action dated Aug. 25, 2011.

U.S. Appl. No. 12/186,589, entitled "Managing Voicemail Messages Based on Location of Caller's Wireless Communication Device"; Non-final office action dated Mar. 8, 2011.

* cited by examiner

Fig. 1

| DATABASE 252 | | | |
|---|---|---|---|
| LOCATION 204 | VM 207 | AUTHORIZED CALLERS 208 | TIMESTAMP 210 |
| X 206 | MESSAGE 1 218 | CALLER 1, 2, 3 224 | 1:30 PM (EST) 230 |
| Y 212 | MESSAGE 2 220 | CALLER 1, 4, 7 226 | 5:00 PM (EST) 232 |
| Z 214 | MESSAGE 3 222 | CALLER 2, 3, 7 228 | 7:45 PM (EST) 234 |

| DATABASE 552 | |
|---|---|
| CALLER LOCATION 554 | PROTOCOL 557 |
| A 556 | PROTOCOL 1 558 |
| B 552 | PROTOCOL 2 560 |
| C 554 | PROTOCOL 3 562 |

| DATABASE 652 | | | | | |
|---|---|---|---|---|---|
| LOCATION 604 | VM 607 | AUTHORIZED CALLERS 608 | TIMESTAMP 610 | CALLER LOCATION 654 | PROTOCOL 657 |
| X 606 | MESSAGE 1 618 | CALLER 1, 2, 3 624 | 1:30 PM (EST) 630 | A 656 | PROTOCOL 1 658 |
| Y 612 | MESSAGE 2 620 | CALLER 1, 4, 7 626 | 5:00 PM (EST) 632 | B 652 | PROTOCOL 2 660 |
| Z 614 | MESSAGE 3 622 | CALLER 2, 3, 7 628 | 7:45 PM (EST) 634 | C 654 | PROTOCOL 3 662 |

MANAGING VOICEMAIL GREETING BASED ON LOCATION OF WIRELESS COMMUNICATION DEVICE

CROSS REFERENCE TO RELATED APPLICATIONS

This application is a related application to U.S. patent application Ser. No. 12/186,589 (entitled "Managing Voicemail Messages Based on Location of Caller's Wireless Communication Device"), filed concurrently, herewith having the same assignee, hereby incorporated by reference in its entirety.

BACKGROUND

1. Technical Field

The present invention generally relates to wireless telecommunications, and particularly to managing voicemail greetings based on location of the wireless communication device.

2. Description of the Related Art

With the rapid growth of wireless communication and the desire to stay connected, a user can now be reached via his or her wireless communication device at virtually any place and time and for virtually any reason.

A problem is manifested when the user may be giving a sales presentation to a client, only to be interrupted in the middle of his presentation by a family member who would like to inquire about plans for the weekend, or to be interrupted by a text message from a co-worker. While the family query may be legitimate and appropriate during a break in the presentation, it certainly would not be appropriate in the middle of the business presentation in many cultures. Therefore, in such a situation, the user will ignore the call or prevent audible reception of the call by turning the user's device off or operating the device in "Silent" mode so there is little or no sound when an incoming communication occurs. In similar fashion, while the co-worker's text message may be important in some other context, it certainly would not be appropriate if received during the business presentation. However, if the user was not in the middle of the presentation, but instead was working on a draft of the proposal, then the interruption may be appropriate and may even be welcomed.

Often, a user may be in a location where use of a wireless communication device is not permitted, e.g., a library, aircraft, or the like. The user may be unable to respond to communications via the user's wireless communication device because of etiquette concerns, such as while a user is at a social function, or because the user is otherwise occupied temporarily, i.e., in an exercise class, at the theater, or in a meeting. A caller has no information about the user's whereabouts and/or why the user is not answering the call. The caller may call back several times, with no response.

SUMMARY OF ILLUSTRATIVE EMBODIMENTS

Disclosed are a method, a system and a computer program product for managing voicemail greetings on a wireless communication device based on the device's location. A user records location-specific voicemail greetings on the user's wireless communication device, and associates the greetings with specific locations. When an authorized caller calls the user's wireless communication device, the location of the user's wireless communication device is detected, and location information of the user's device is sent to a call switching component. The call switching component presents the caller with the voicemail greeting associated with the location of the user's wireless communication device. The date and time the user's wireless communication device entered the location can be provided via a timestamp and presented to the caller along with the location-specific voicemail greeting, to enable the caller to determine when the user may be available to communicate, based on the combination of the information in the greeting and the timestamp information.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for managing voicemail greetings of a wireless communication device based on the device's location. A user records location-specific voicemail greetings on the user's wireless communication device, and associates the greetings with specific locations. When an authorized caller calls the user's wireless communication device, the location of the user's wireless communication device is detected, and location information of the user's device is sent to a call switching component. The call switching component presents the caller with the voicemail greeting associated with the location of the user's wireless communication device. The date and time the user's wireless communication device entered the location can be provided via a timestamp and presented to the caller along with the location-specific voicemail greeting, to enable the caller to determine when the user may be available to communicate, based on the combination of the information in the greeting and the timestamp information.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 152 for FIGS. 1 and 252 for FIG. 2). The specific numerals assigned to the elements are provided solely to aid in the description and not meant to imply any limitations (structural or functional) on the invention.

The features described herein provide a user of a wireless communication device the ability to present a prerecorded location-specific greeting to an authorized caller, where the greeting is triggered based on the location information of the user's wireless communication device.

Presently, with wireless communication devices, users do not have location-specific voicemail. Thus, the user of the device is unable to easily convey to callers additional location-specific details with their voicemail greeting. This is especially problematic with cellular phones where a user may wish to give more accurate information in their voicemail greetings, such as to announce they are in a library and will not be answering their cellular phone. It is currently not known to automatically select voicemail greetings based on physical location of the wireless communication device.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. While the embodiment to be subsequently described relates to cellular telephones, the principles of the invention would be applicable to any wireless personal communications device that could be used to communicate in a cellular telecommunications system. These would include the wide variety of currently available communicating personal palm devices or Personal Digital Assistants (PDAs), which include, for example, devices using Microsoft's WinCE, Palm, Inc's Palm OS, and ACCESS's Garnet OS, such as a PDA, cellular phone, laptop computer, or other such wireless communication device.

Figure 1:
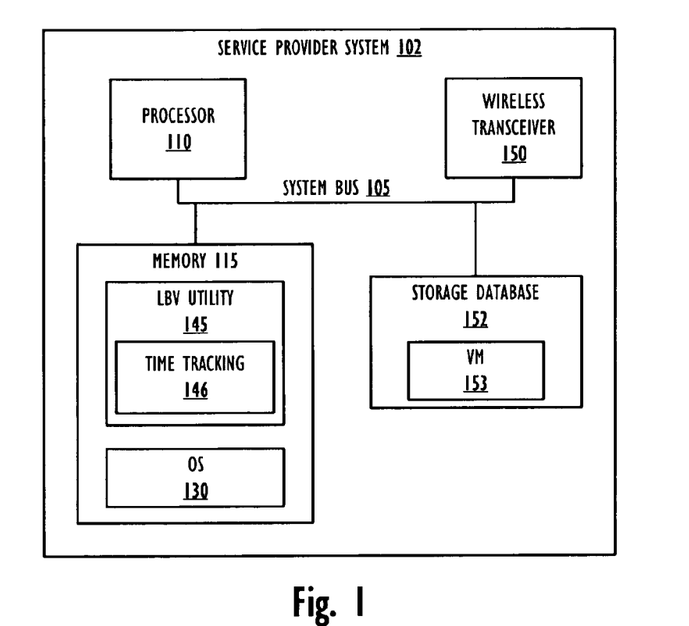
FIG. 1 is a block diagram of a service provider system configured with hardware and software components for implementing one or more embodiments of the invention.

With reference now to the figures, and in particular FIG. 1, which depicts a block diagram representation of a service provider system. Service provider system 102 comprises at least one processor 110 connected to memory 115 via system bus 105. Memory 115 is defined as a lowest level of volatile memory (not shown), including, but not limited to, cache memory, registers, and buffers. Also connected to system bus 105 is storage database 152, having stored therein one or more voicemail mailboxes 153 for a user's wireless communication device. It is understood that the system can support multiple user devices.

Service provider system 102 is also illustrated with a wireless transceiver 150 coupled to system bus 105. Wireless transceiver 150 enables service provider system 102 to connect to and exchange communication with one or more wireless communication devices.

Those of ordinary skill in the art will appreciate that the hardware depicted in FIG. 1 is a basic illustration of a service provider system, and thus the hardware utilized in actual implementation may vary. Thus, the depicted example is not meant to imply architectural limitations with respect to the present invention. Also, components of the service provider system 102 may be distributed components, not present in a single device or single casing. Also, while the illustrative embodiments are described from the perspective of functions occurring at the service provider system 102, it is appreciated that various functions of the described embodiments may also be performed by the wireless communication device. This implementation is also covered by the scope of the invention.

Notably, in addition to the above described hardware components of service provider system 102, various features of the invention are completed via software (or firmware) code or logic stored within memory 115 or other storage (e.g., storage database 152) and executed by processor 110. In one embodiment, data/instructions/code from storage database 152 populates the memory 115, which is also coupled to system bus 105. Thus, illustrated within memory 115 are a number of software/firmware components, including operating system (OS) 130, a Location-Based Voicemail (LBV) utility 145, and a Location Caller Device (LCD) utility (not shown). The LBV utility 145 includes a time tracking component 146 configured to calculate amount of time a device has been at a specific location.

In actual implementation, LBV utility 145 may be a single application providing the various functions of multiple individual software components when the corresponding code is executed by the processor 110. For simplicity, LBV utility 145 is illustrated and described as a stand alone or separate software/firmware component, which is stored in memory 115 to provide/support the specific novel functions described herein.

Processor 110 executes LBV utility 145 as well as OS 130, which supports the user interface features of LBV utility 145. In the illustrative embodiment, LBV utility 145 generates/provides several graphical user interfaces (GUI) to enable user interaction with, or manipulation of, the functional features of the LBV utility (145). Among the software code/instructions provided by LBV utility 145, and which enables features specific to the invention, are: (a) code for recording location-specific voicemail greetings via a user's wireless communication device; (b) code for associating location-specific voicemail greetings with specific selected locations; (c) code for receiving identifying information corresponding to at least one authorized caller authorized to receive the location-specific greeting; (d) code for detecting/receiving a location of the wireless communication device when a call is received by the wireless communication device; (e) code for determining whether the caller is an authorized caller; (f) code for determining when the device is in a pre-identified location; and (g) code for presenting the location-specific voicemail greeting associated with the location of the wireless communication device to the authorized caller. For simplicity of the description, the collective body of code that enables these various features is referred to herein as LBV utility 145. According to the illustrative embodiment, when processor 110 executes LBV utility 145, service provider system 102 initiates a series of functional processes that enable the above functional features as well as additional features/functionality, which are described below within the description of FIGS. 2-7.

Processor 110 executes LCD utility (not shown) as well as OS 130, which supports the user interface features of LCD utility. In the illustrative embodiment, LCD utility generates/provides several graphical user interfaces (GUI) to enable user interaction with, or manipulation of, the functional features of the LCD utility. Among the software code/instructions provided by LCD utility, and which enables features specific to the invention, are: (a) code for assigning call answering protocols for implementation based on a location of a caller's wireless communication device at a time a call is received from the caller's device; (b) code for receiving an entry of one or more call answering selection protocols via a wireless communication device; (c) code for detecting a location of the caller's wireless communication device when a call is received; (d) code for receiving location information regarding the caller's wireless communication device at a call switching component; and (e) code for processing the call at the call switching component based on the call answering protocol for handling a caller's call receiving from the location of the caller's wireless communication device. For simplicity of the description, the collective body of code that enables these various features is referred to herein as LCD utility. According to the illustrative embodiment, when processor 110 executes LCD utility, service provider system 102 initiates a series of functional processes that enable the above functional features as well as additional features/functionality, which are described below within the description of FIGS. 2-7.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention.

In one alternate implementation, the invention may be implemented at/on the user device, eliminating the need for the service provider system 102 to perform the steps related to location-based voicemail. With this alternate implementation, the user's wireless communication device records the location-specific voicemail greetings for the user's wireless communication device, associates the location-specific voicemail greetings with specific locations, and receives identifying information corresponding to at least one authorized caller to receive the location-specific greeting. The user's wireless communication device also detects a current location of the wireless communication device when a call is received by the wireless communication device, and in response to one of the current locations being one of the specific locations, presents the location-specific voicemail greeting associated with the current location of the wireless communication device to the authorized caller. In one embodiment, the user can update voicemail greeting features online at a service provider website.

Figure 2:
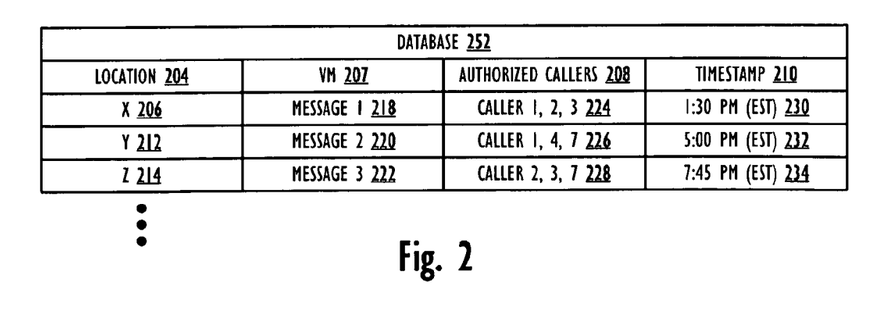
FIG. 2 illustrates an example database showing location information associated with prerecorded voicemail greetings and authorized caller lists, in accordance with one embodiment of the invention.

With reference now to FIG. 2, a database 252 is shown in which location-specific voicemail greetings 207 entered by a user of a wireless communication device are stored. The user records location-specific voicemail greetings 207, e.g. message 1 218, message 2 220, message 3 222, on the database 252 via the user's wireless communication device. The user also enters specific locations 204, e.g. location X 206, location Y 212, location Z 214, and associates the location-specific voicemail greetings 218, 220, 222 with the locations 206, 212, 214. The user can create an authorized caller list 208 for each location 204 by entering and storing identifying information into the user's wireless communication device. The identifying information corresponds to at least one authorized caller to receive the location-specific greetings.

It is understood that the user can create one authorized caller list to be associated with all locations, or the user can create a separate authorized caller list for each location. For example, a user may want to include business associates in an authorized caller list that is associated with various office or business locations, but exclude these business associates from authorized caller lists that are associated with personal locations, such as the gym or other personal recreational locations. And the user may want to include family members on all authorized caller lists. Further, the user can create an authorized caller list that includes all callers irrespective of caller identity. This list may be a default setting, absent user input/selection of a specific list of authorized callers for a particular location.

During the location-based voicemail retrieval process, a determination is made by the system regarding whether the caller is an authorized caller for the location 204 in which the user's wireless communication device is located. The determination of a caller's identity for the purpose of authorizing may be one or more of: a Caller ID match, voice pattern recognition, spoken password or passphrase analyzed through a speech to text conversion, or a dialed code. In cases where the authorized caller list includes all callers, no determination of a caller's identity need be performed.

A timestamp 210 can be created by the system and associated with the location 204 in which the user's wireless communication device is located. A mechanism detects lack of movement of the user's wireless communication device. The mechanism enables the location-specific voicemail greeting 207 when the user's wireless communication device is stationary for a predefined period of time. The date and time the user's wireless communication device entered a specific location is detected, and the amount of time the user's wireless communication device has been at the location 204 is calculated. The date and time information the device entered the location 204 and/or the calculated time the user's wireless communication device has been at the location 204 can be automatically inserted into the header of the location-specific voicemail greeting 207 and presented to the caller along with the location-specific voicemail greeting 207.

For example, in FIG. 2, if caller 1 calls the user's wireless communication device while the user's wireless communication device is in location X 206, then the associated location-specific voicemail greeting 1 218 will be presented to authorized caller 1 224. The timestamp 230 is also presented to the authorized caller 1 224, e.g. "user entered location X at 1:30 pm (EST)" and/or "user entered location X 23 minutes ago." It is understood that the announcement of time may suppress the time zone if Caller ID suggests the caller is in the same time zone. Similarly, that time may be converted to the time of the caller based on the area code within the Caller ID compared against a table of area codes for time zone mapping. However, if caller 1 calls the user while the user's wireless communication device is in location Z 214, since caller 1 is not on the authorized caller list 228 for location Z 214, caller 1 will be presented with the user's general voicemail greeting and not the user's location-specific voicemail greeting 222.

Figure 3:
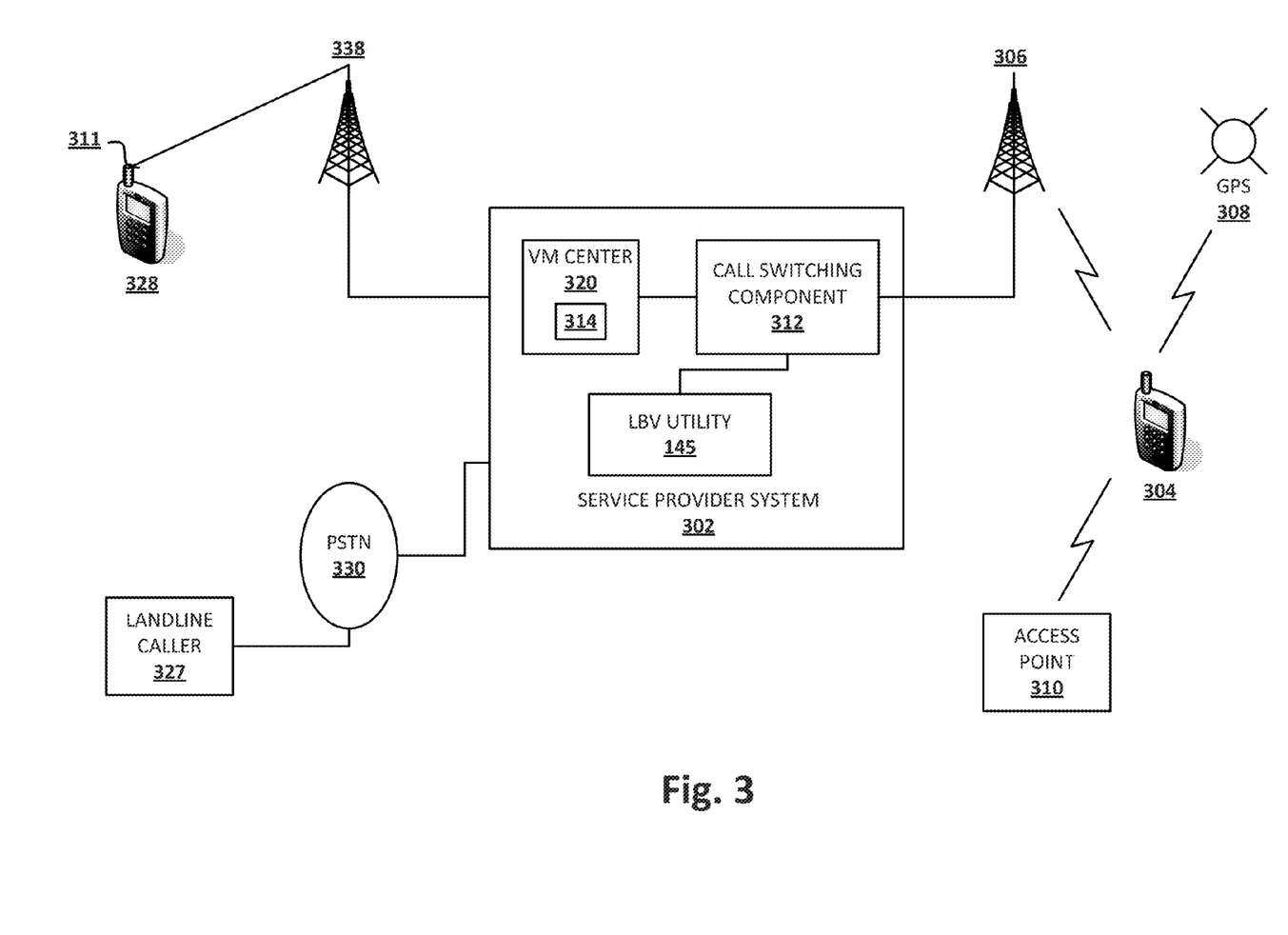
FIG. 3 is a diagram of a communication system in which a wireless communication device manages voicemail greetings via a service provider system, based on location of the wireless communication device according to one embodiment.

FIG. 3 is a diagram illustrating a communication system in which a service provider system manages the voicemail mailbox of a user's wireless communication device. In FIG. 3, a caller uses the caller's wireless communications device 328 or landline caller 327, or other calling device to call a user's wireless communication device 304. A landline telephone 327 is connected to a Public Switched Telephone Network (PSTN) 330, while a wireless communication device 328 is connected via wireless communication device's antenna 311 to a cellular tower 338.

The user's wireless communication device 304 provides voicemail menu options and a mechanism for the user to scroll to a correct setting and associate pre-recorded location-specific greetings with specific locations. When the user connects to a voicemail center 320 via a service provider system 302, a utility, i.e., LBV utility 145 (FIG. 1), allows the user to record location-specific voicemail greetings or messages, set locations, and associate the locations with corresponding recorded voicemail greetings.

It is understood that the user may interact with the utility via other means such as from a computer accessing a web application. A user can define different locations, upload and store the different locations at the voicemail center 320 and associate the locations with recorded voicemail greetings. The locations can be stored on the user's wireless communication device 304, or in an alternate embodiment, the user can store the locations at a service provider via a call switching component. A user can manually use a menu option and mechanism on the user's wireless communication device 304 to have a location-specific voicemail greeting to be presented to callers.

In FIG. 3, when the user does not answer his device 304 or the device 304 is in a "do not disturb" mode, the call switching component 312 determines that the user's wireless communication device 304 is not answering the call. Before being powered off or at some pre-set period, the device 304 detects the device's 304 current location based on a Global Positioning System (GPS) 308, wireless access point 310, or cellular tower 306, and the device 304 sends the location information to the call switching component 312.

In the illustrative embodiment, the location 204 of the user's wireless communication device is received by a call switching component. The call switching component presents the location-specific voicemail greeting 207 associated with the location 204 of the user's wireless communication device to the authorized caller 208. The location 204 of the user's wireless communication device is determined when a call is received from a caller at the user's wireless communication device. As illustrated by FIG. 3, detection of the location 204 of the user's wireless communication device can be based on GPS coordination 308, a known location of a wireless access point detectable by the wireless communication device, or by the device communicating with one or more cellular/signal towers. With the latter detection method, the location 204 of the wireless communication device is determined by the closest tower, or by triangulation of signal strength to two or more towers. The call switching component 312 presents to an authorized caller the location-specific voicemail greeting recorded in the user's voicemail mailbox 314 located at voicemail center 320 of service provider system 302.

Location-specific voicemail greetings may provide more information, such as time of the user's return to a location, to an authorized caller receiving the location-specific voicemail greeting. When the user creates the location-specific voicemail greetings, the user provides the location name to the system, records the voicemail greeting, identifies the location with such identifiers as postal code, GPS coordination 308, wireless access point 310, closest cellular tower 306, triangulation, or the like. The user selects a set of people that are deemed as authorized callers who may hear the location-based voicemail greeting. The user can set an automatic insertion of a timestamp into the voicemail greeting, giving the time that the user's wireless communication device 304 entered the location. In an alternate embodiment, the location of a user's wireless communication device 304 is determined by the call switching component 312 based on a cellular tower 306 that is currently communicating with the user's wireless communication device 304.

In the described embodiments, a determination is made regarding whether a caller is authorized to receive the user's location-specific voicemail greeting. Location-specific voicemail greeting authorization is performed to verify the caller is permitted to hear a location-specific voicemail greeting. If a caller is not authorized to receive a location-specific voicemail greeting, voicemail center 320 will play the standard voicemail greeting. Often, a user's recorded location-specific voicemail greeting may state that the user will be at the location for a specified period of time, e.g. one hour. An authorized caller will be better informed regarding the user's availability to communicate if the caller is informed about the time the user's wireless communication device entered the location. For example, if the user entered the location at 1:30 pm (EST), and the user's location-specific voicemail greeting states the user will be at the location for one hour, then the caller can deduce that the user will be leaving the location at 2:30 pm (EST). The user could also set the timestamp feature to include the location with the timestamp. For example, voicemail center 320 may present a greeting stating "I am at the gym right now, and will be available after my one hour workout". The voicemail center 320 may also append "arrived at location 'gym' 23 minutes ago." If a caller is authorized for receiving the location-specific voicemail greeting, voicemail center 320 will play the location-specific and timestamp greeting.

Figure 4:
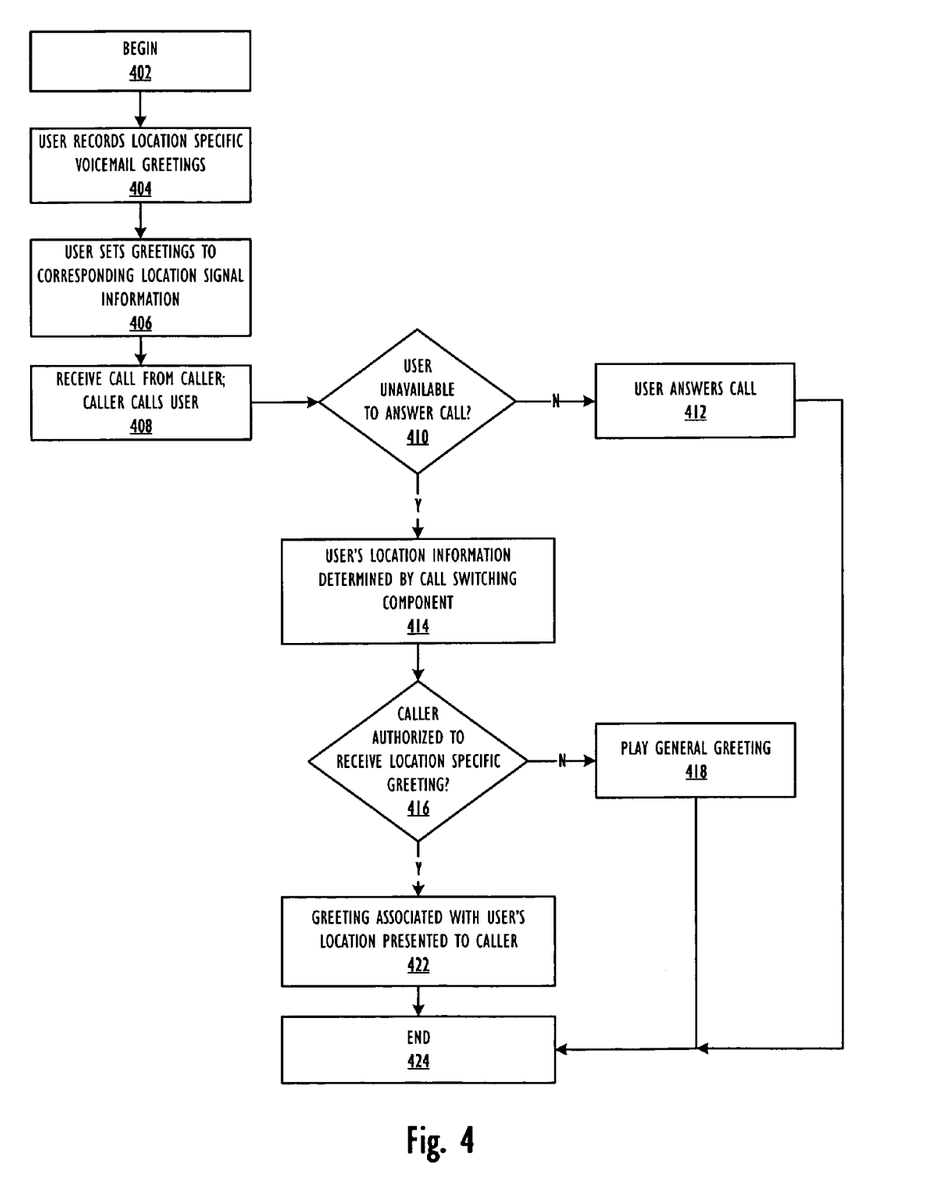
FIG. 4 is a flow chart of the process of managing voicemail greetings based on location of a user's wireless communication device, according to one embodiment of the invention.

FIG. 4 is a flow chart illustrating a method by which the above processes of the illustrative embodiments are completed. Although the method illustrated in FIG. 4 may be described with reference to components shown in FIGS. 1, 2, and 3, it should be understood that this is merely for convenience and alternative components and/or configurations thereof can be employed when implementing the various methods. Key portions of the method may be completed by LBV utility 145 executing within service provider system 102 (FIG. 1) and controlling specific operations of/on service provider system 102, and the method is thus described from the perspective of either/both LBV utility 145 and service provider system 102. Alternatively, specific functions may be provided by a similar utility executing within a wireless communication device.

FIG. 4 begins at initiator block 402 and proceeds to block 404, wherein a user records location-specific voicemail greetings, block 404. The user associates the location-specific greetings to correspond with specific locations, block 406. When a call is received from a caller who is calling the user, block 408, a determination is made regarding whether the user is unavailable to answer the caller's call, block 410. If the user is available to answer the caller's call and the user answers the call, block 412, the process ends, block 424. If the user is unavailable to answer the caller's call, i.e., the caller's call is unanswered, or the user's wireless communication device is turned off, triggering an automatic forward of the incoming call to voicemail, the user's wireless communication device's location is retrieved by a call switching component, block 414.

A determination is made regarding whether the caller is authorized for receipt of a location-specific voicemail greeting, block 416. The user may authorize specific individuals or groups to receive location-specific voicemail greetings.

Location-specific voicemail greetings may reduce user privacy, and therefore, the user may wish to only enable these greetings for friends, family, and other known contacts. Such a system may be enabled on the user's device by: (a) selecting specific incoming phone numbers that may hear location-specific voicemail greetings; (b) a binary switch enabling all incoming numbers with corresponding phonebook entries to receive the particular location-specific voicemail greetings; or (c) other known methods of selecting a subset of items from a larger list. In alternate embodiments, the user may authorize phone numbers through interaction with the user's voicemail system, a website maintained by the service provider, or through interaction with a support representative of the service provider.

If a caller is not authorized to receive the location-specific voicemail greeting, the user's general voicemail greeting is played for the unauthorized caller, block 418, and the process ends, block 424. The features described herein may be implemented as a service provided by a mobile service provider, charged based on subscription and volume rate, as an extension of a voicemail system, or via any similar fashion.

In some embodiments, location-specific voicemail greetings may only be enabled if the device is stationary for a predefined period of time. Wireless communication devices that are capable of detecting their location via GPS subsystems or cellular tower triangulation/strength detection may employ the same technology to detect lack of movement of the device. Embodiments that employ the stationary timer may prevent the playback of location-specific voicemail greetings when the user's device is only traveling through a region, so as to avoid confusion to the caller. For example, if the user has a location-specific voicemail greeting for the gym and is driving by the gym while a caller is transferred to voicemail, it would be incorrect to play the gym location greeting to the caller, as the user is not actually at the gym. In embodiments that contain this feature, the user may also be able to specify (a) which locations require movement detection to be enabled, and (b) a predetermined amount of time required per location for detection of the device being stationary.

Figure 5:
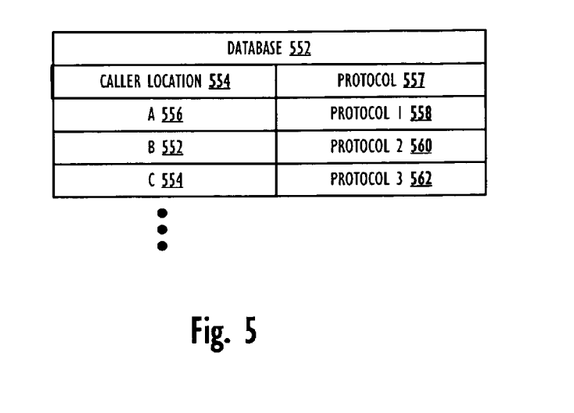
FIG. 5 illustrates an example database showing callers' wireless communication device locations associated with call answering protocols, in accordance with one embodiment of the invention.

FIG. 5 shows an alternate embodiment of the invention. According to this alternate embodiment, the location of the caller may modify the treatment of the voicemail processing by voicemail system of the user's wireless communication device. In FIG. 5, a database 552 is shown with caller locations 554 associated with call answering protocols 557. For example, caller location A 556 is an airport. The user is expecting a visitor to arrive at the airport within the next hour, but the user must attend an important business meeting. The user can associate a call answering protocol, i.e. protocol 1 558, with caller location A 556, that directs the caller's call from the airport to be converted to text, with the text being emailed to one or more parties, such as the user, or the user's secretary or spouse, to enable others to know of the visitors arrival without delay. Caller location B 552 could be set as the local hospital where the user's love one is being treated. The user may want to associate location B 552 with call answering protocol 2 560 that transfers the caller's voicemail message to one or more phone systems, such as the user's private office line and home telephone. Location C 554 can be the user's business. The user may want to associate location C 554 with call answering protocol 3 562 that changes the priority of voicemail messages in the user's voicemail mailbox so that all voicemail messages from callers at the user's business are played to the user before any other voicemail messages in the user's voicemail mailbox. The user could also set call answering protocols to record voicemail messages received from calls originating from the user's business in a different voicemail mailbox, such as the user's secretary's voicemail mailbox, or the like.

Figure 6:
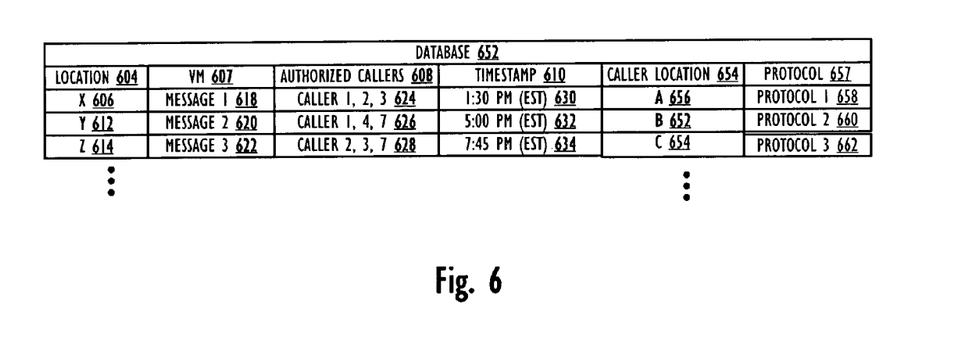
FIG. 6 illustrates an example database showing location information of a user's wireless communication device and callers' wireless communication device, in accordance with the invention.

FIG. 6 shows a more detailed example of a database 652 incorporating both the management of location-specific voicemail greetings based on a user's wireless communication device location and the processing of calls to the user based on a location of a caller's wireless communication device. With reference now to FIG. 6, a database 652 is shown in which location-specific voicemail greetings 607 entered by a user of a wireless communication device are stored. The user records location-specific voicemail greetings 607, e.g. message 1 618, message 2 620, message 3 622, on the database 652 via the user's wireless communication device. The user also enters specific locations 604, e.g. location X 606, location Y 612, location Z 614, and associates the location-specific voicemail greetings 618, 620, 622 with the locations 606, 612, 614. The user can create an authorized caller list 608 for each location 604 by entering and storing identifying information into the user's wireless communication device corresponding to at least one authorized caller.

A timestamp 610 can be associated with the location 604 in which the user's wireless communication device is located. A mechanism detects lack of movement of the user's wireless communication device and can be set to enable the location-specific voicemail greeting 607 when the user's wireless communication device is stationary for a predefined period of time to avoid confusion when a user is mobile. The date and time the user's wireless communication device entered a specific location is detected, and the amount of time the user's wireless communication device has been at the location 604 is calculated. The date and time information the device entered the location 604 and/or the calculated time the user's wireless communication device has been at the location 604 can be automatically inserted into the header of the location-specific voicemail greeting 607 and presented to the caller along with the location-specific voicemail greeting 607.

The user assigns call answering protocols 657 for an authorized caller based on a location 654 of a caller's wireless communication device at the time a call is initiated by the caller. The call answering protocols 657 are entered into the user's wireless communication device. During receipt of a call, the location 654 of the caller's wireless communication device is detected. The information about the location 654 of the caller's wireless communication device is sent to the user's wireless communication device, or the call switching component. The call is processed by the call switching component based on the user's predetermined call answering protocol 657 for handling the caller's call based on and considering the location 654 of the caller's wireless communication device.

For example, in FIG. 6, if caller 1 624 calls the user's wireless communication device while the user's wireless communication device is in location X 606, then the associated location-specific voicemail greeting 1 618 will be presented to authorized caller 1 624. The timestamp 630 is also presented to the authorized caller 1 624. If the call from the wireless communication device of caller 1 624 is detected as calling from location A 656, i.e. the airport, the call switching component will process the caller's call. In FIG. 6, the focus is on the location of the caller's wireless communication device, and not the user's wireless communication device. However, the user's device location is used for presenting the location-specific voicemail greeting to the authorized caller. As described above, the call answering protocols 657 for an authorized caller based on a location 654 are of a caller's wireless communication device at the time a call is initiated by the caller. For example, in FIG. 6, call answering protocol 1 658 is associated with the location of the caller's wireless communication device (Location A 656). Call answering protocol 1 658 will direct the caller's call to be converted to text, with the text being emailed to one or more parties, such as the user, or the user's secretary or spouse, to enable others to know of the visitors arrival without delay.

It is understood that if any of the rules described in FIG. 6 conflict in a given scenario (i.e., the caller or user combination result in more than one voicemail greeting or more than one protocol, or the voicemail greeting and protocol are contradictory), there is conflict resolution, such as establishing priority of the rules, randomly selecting, preventing such rules from being added to the database, or prompting the user or caller.

Figure 7:
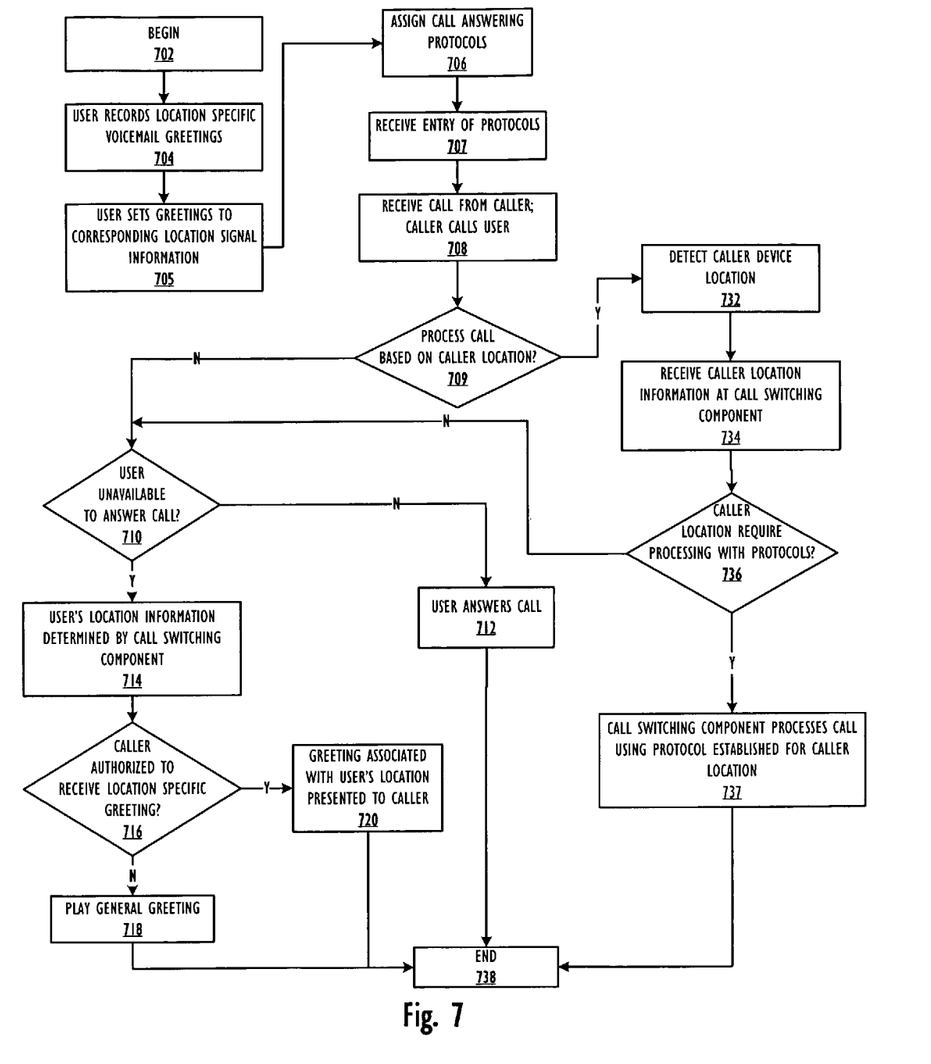
FIG. 7 is a flow chart of the process of managing voicemail greetings based on (a) location of a user's wireless communication device and (b) location of a caller's wireless communication device, according to one embodiment of the invention.

FIG. 7 is a flow chart illustrating a method by which the above processes of the illustrative embodiments are completed. Although the method illustrated in FIG. 7 may be described with reference to components shown in FIGS. 1, 2, 3, 5, and 6, it should be understood that this is merely for convenience and alternative components and/or configurations thereof can be employed when implementing the various methods. Key portions of the method may be completed by LBV utility 145 executing within service provider system 102 (FIG. 1) and controlling specific operations of/on service provider system 102, and the method is thus described from the perspective of either/both LBV utility 145 and service provider system 102. Alternatively, specific functions may be provided by a similar utility executing within a wireless communication device.

FIG. 7 begins at initiator block 702, and proceeds to block 704, wherein a user records location-specific voicemail greetings, block 704. The user associates the location-specific greetings to correspond with specific locations, block 705. Call answering protocols based on a caller's device location are assigned, block 706. The call answering protocols are entered into a user's wireless communication device, block 707. When a call is received from a caller who is calling the user, block 708, a determination is made regarding whether the treatment of voicemail processing is to be modified based on a location of a caller's wireless communication device, block 709. For example, the user may define that voicemails left from callers when the caller's communication device is at specific regions, e.g., the office, the airport, or the like, may be processed differently by the system.

If, in response to the determination at block 709, the voicemail processing is not to be modified by the location of the caller's communication device, the process continues to block 710. A determination is made regarding whether the user is unavailable to answer the caller's call, block 710. If the user is available to answer the caller's call, the user answers the call, block 712, and the process ends, block 738. If the user is unavailable to answer the caller's call, the location of the user's wireless communication device is determined by a call switching component, block 714.

In FIG. 7, a determination is made regarding whether the caller is authorized for receipt of a location-specific voicemail greeting, block 716. The user may authorize specific individuals or groups to receive location-specific voicemail greetings. If a caller is not authorized to receive the location-specific voicemail greeting, the user's general voicemail greeting is played for the unauthorized caller, block 718, and the process ends, block 738. In some embodiments, after a caller is determined to not be eligible for a user location-specific greeting, a determination about whether any caller location-specific protocols exist can be made. If a caller is authorized to receive the location-specific voicemail greeting, the location-specific voicemail greeting associated with the location of the user's wireless communication device is retrieved and presented to the authorized caller, block 720, and the process ends, block 738.

If the treatment of voicemail processing is to be modified based on the location of the caller's communication device, the location of the caller's wireless communication device is detected, block 732. Location information of the caller's wireless communication device is sent to a call switching component, block 734.

A determination is made regarding whether the location of the caller's wireless communication device requires the call to be processed differently from traditional processing methods, block 736, based on the call answering protocols pre-set by the user. If the caller's call does not require a modification in treatment of voicemail processing, the process goes to the determination step at block 710 regarding whether the user is unavailable to answer a call. If the location of the caller's wireless communication device is a location that requires the caller's call to be treated differently, the caller's call is processed by call switching component, block 737. The caller's call will be processed based upon the assigned call answering protocols for the caller's location. Different processes may be provided for determining voicemail based on the caller's location. The processes include, but are not limited to (a) recording voicemail in a different voicemail mailbox; (b) converting the caller's voicemail message to text and emailing the text to one or more parties; (c) changing priority of voicemail message in the user's voicemail mailbox; and (d) transferring call to one or more phone systems, and enabling actions on all voicemail messages associated with a location, such as to delete all, mark all as heard. Once the call switching component processes the caller's call, the process ends, block 738.

The features described herein may be implemented as a service provided by a mobile provider, charged based on subscription and volume rate, as an extension of a voicemail system, or any similar fashion. In an alternate embodiment, the features are implemented on the user's wireless communication device, rather than a separate call switching component.

In the flow charts above, the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, and DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system comprising:
    a bus;
    a processor coupled to the bus;
    a memory coupled to the bus; and
    a computer readable tangible storage device coupled to the bus, the computer readable tangible storage device containing instructions that, when carried out by the processor via the memory, implement a method for managing voicemail greetings of a wireless communication device based on a location of the wireless communication device, the method comprising the steps of:
        the processor recording one or more location-specific voicemail greetings for the wireless communication device, wherein each of the one or more location-specific voicemail greetings is a different greeting from a general voicemail greeting that is not dependent on a location of the wireless communication device;
        the processor associating each of the one or more location-specific voicemail greetings with a specific location of a plurality of specific locations to which the wireless communication device can be moved, wherein each of the one or more location-specific voicemail greetings is associated with a different specific location;
        the processor periodically receiving current locations of the wireless communication device in response to receipt of a call by the wireless communication device from a caller device;
        the processor determining that the wireless communication device is stationary when the periodically received current locations are a same current location for a predefined period of time; and
        in response to the determination that the wireless communication device is stationary and the same current location being one of the specific locations associated with a recorded location-specific voicemail greeting, the processor presenting the recorded location-specific voicemail greeting associated with the same current location of the wireless communication device to the caller device.

2. The system of claim 1, wherein said method further comprises:
    the processor receiving identifying information corresponding to at least one authorized caller to receive the recorded location-specific voicemail greeting;
    the processor creating an authorized caller list for the recorded location-specific voicemail greeting by storing the identifying information received;
    the processor determining whether a caller using the caller device is an authorized caller to receive the recorded location-specific voicemail greeting by comparing an identifier (ID) of the caller device with a list of authorized caller IDs of authorized callers corresponding to the same current location, wherein the determining whether the caller is an authorized caller comprises detecting an identity of the caller through at least one of: Caller ID, voice pattern recognition, spoken password or passphrase converted via a speech-to-text module, a dialed code, and interaction with a service provider; and
    the processor presenting the recorded location-specific voicemail greeting only if the caller is authorized or the processor presenting the general voicemail greeting if the caller is not authorized.

3. The system of claim 1, wherein the method further comprises:
    the processor detecting a date and time the wireless communication device entered a location;
    the processor calculating an amount of time the wireless communication device has been at the location;
    the processor automatically inserting the detected date and time into the recorded location-specific voicemail greeting; and
    the processor presenting the detected date and time with the recorded location-specific voicemail greeting.

4. The system of claim 1, wherein said method further comprises:
    the processor assigning call answering protocols for implementation based on a location of a caller's wireless communication device at a time a call is received from the caller's wireless communication device;
    the processor receiving an entry of one or more call answering protocols via the wireless communication device;
    the processor detecting a location of the caller's wireless communication device when a call is received;
    the processor receiving location information regarding the caller's wireless communication device at a call switching component; and
    the processor processing the call at the call switching component based on a call answering protocol for handling a caller's call received from the location of the caller's wireless communication device when the call is received.

5. The system of claim 4, wherein the call answering protocols are at least one of recording a caller's voicemail message in a different voicemail mailbox other than a voicemail mailbox of the wireless communication device, converting the caller's voicemail message to text and emailing the text to one or more parties, transferring the caller's voicemail message to more than one phone system, and changing priority of voicemail messages in the voicemail mailbox of the wireless communication device.

6. The system of claim 1, wherein the system is enabled within the wireless communication device.

7. A method for managing voicemail greetings of a wireless communication device based on a location of the wireless communication device, said method comprising:
  a computer recording one or more location-specific voicemail greetings for the wireless communication device, wherein each of the one or more location-specific voicemail greetings is a different greeting from a general voicemail greeting that is not dependent on a location of the wireless communication device;
  the computer associating the one or more location-specific voicemail greetings with specific locations;
  the computer periodically receiving current locations of the wireless communication device in response to receipt of a call by the wireless communication device from a caller device;
  the computer determining that the wireless communication device is stationary when the periodically received current locations are a same current location for a predefined period of time; and
  in response to the determination that the wireless communication device is stationary and the same current location being one of the specific locations, the computer presenting the location-specific voicemail greeting associated with the same current location of the wireless communication device to the caller device.

8. The method of claim 7, further comprising:
  the computer receiving identifying information corresponding to at least one authorized caller to receive the location-specific voicemail greeting;
  the computer creating an authorized caller list for the location-specific voicemail greeting by storing the identifying information received;
  the computer determining whether a caller using the calling device is an authorized caller to receive the location-specific voicemail greeting by comparing an identifier (ID) of the caller device with a list of authorized caller IDs of authorized callers corresponding to the same current location;
  wherein the determining whether the caller is an authorized caller comprises detecting an identity of the caller through at least one of: Caller ID, voice pattern recognition, spoken password or passphrase converted via a speech-to-text module, a dialed code, and interaction with a service provider; and
  the computer presenting the location-specific voicemail greeting only if the caller is authorized or the computer presenting the general voicemail greeting if the caller is not authorized.

9. The method of claim 7, further comprising:
  the computer detecting a date and time the wireless communication device entered a location;
  the computer calculating an amount of time the wireless communication device has been at the location;
  the computer automatically inserting the detected date and time into the location-specific voicemail greeting; and
  the computer presenting the detected date and time with the location-specific voicemail greeting.

10. The method of claim 7, further comprising:
  the computer assigning call answering protocols for implementation based on a location of a caller's wireless communication device at a time a call is received from the caller's wireless communication device;
  the computer receiving an entry of one or more call answering protocols via the wireless communication device;
  the computer detecting a location of the caller's wireless communication device when a call is received;
  the computer receiving location information regarding the caller's wireless communication device at a call switching component; and
  the computer processing the call at the call switching component based on a call answering protocol for handling a caller's call received from the location of the caller's wireless communication device when the call is received;
  wherein the call answering protocols are at least one of recording a caller's voicemail message in a different voicemail mailbox other than a voicemail mailbox of the wireless communication device, converting the caller's voicemail message to text and emailing the text to one or more parties, transferring the caller's voicemail message to more than one phone system, and changing priority of voicemail messages in the user's wireless communication device voicemail mailbox.

11. A computer program product having a computer readable tangible storage device having computer code stored therein that when executed by a processor, implements a method for managing voicemail greetings of a wireless communication device based on a location of the device, the method comprising the steps of:
  the processor recording one or more location-specific voicemail greetings for the wireless communication device, wherein each of the one or more location-specific voicemail greetings is a different greeting from a general voicemail greeting that is not dependent on a location of the wireless communication device;
  the processor associating the one or more location-specific voicemail greetings with specific locations;
  the processor periodically receiving current locations of the wireless communication device in response to receipt of a call by the wireless communication device from a caller device;
  the processor determining that the wireless communication device is stationary when the periodically received current locations are a same current location for a predefined period of time; and
  in response to the determination that the wireless communication device is stationary and the same current location being one of the specific locations, the processor presenting the location-specific voicemail greeting associated with the same current location of the wireless communication device to the caller device.

12. The computer program product of claim 11, wherein the method further comprises the steps of:
  the processor receiving identifying information corresponding to at least one authorized caller to receive the location-specific voicemail greeting;
  the processor creating an authorized caller list for the location-specific voicemail greeting by storing the identifying information received;
  the processor determining whether a caller using the caller device is an authorized caller to receive the location-specific voicemail greeting by comparing an identifier (ID) of the caller device with a list of authorized caller IDs of authorized callers corresponding to the same current location, wherein the determining whether the caller is an authorized caller comprises detecting an identity of the caller through at least one of: Caller ID, voice pattern recognition, spoken password or passphrase converted via a speech-to-text module, a dialed code, and interaction with a service provider; and the processor presenting the location-specific voicemail greeting only if the caller is authorized or the processor presenting the general voicemail greeting if the caller is not authorized.

13. The computer program product of claim 11, wherein the method further comprises the steps of:

the processor detecting a date and time the wireless communication device entered a location;

the processor calculating an amount of time the wireless communication device has been at the location;

the processor automatically inserting the detected date and time into the location-specific voicemail greeting; and the processor presenting the detected date and time with the location-specific voicemail greeting.

14. The computer program product of claim 11, wherein the method further comprises the steps of:

the processor assigning call answering protocols for implementation based on a location of a caller's wireless communication device at a time a call is received from the caller's wireless communication device;

the processor receiving an entry of one or more call answering protocols via the wireless communication device;

the processor detecting a location of the caller's wireless communication device when a call is received;

the processor receiving location information regarding the caller's wireless communication device at a call switching component; and the processor processing the call at the call switching component based on a call answering protocol for handling a caller's call received from the location of the caller's wireless communication device when the call is received;

wherein the call answering protocols are at least one of recording a caller's voicemail message in a different voicemail mailbox other than a voicemail mailbox of the wireless communication device, converting the caller's voicemail message to text and emailing the text to one or more parties, transferring the caller's voicemail message to more than one phone system, and changing priority of voicemail messages in the user's wireless communication device voicemail mailbox.

* * * * *